United States Patent
Yamaoka

(10) Patent No.: US 12,528,201 B2
(45) Date of Patent: Jan. 20, 2026

(54) CONTROL DEVICE FOR ROBOT PERFORMING MASTERING THROUGH TORQUE OR FORCE CONTROL

(71) Applicant: FANUC CORPORATION, Yamanashi (JP)

(72) Inventor: Nobuaki Yamaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 59 days.

(21) Appl. No.: 18/713,705

(22) PCT Filed: Dec. 20, 2021

(86) PCT No.: PCT/JP2021/047092
§ 371 (c)(1),
(2) Date: May 28, 2024

(87) PCT Pub. No.: WO2023/119378
PCT Pub. Date: Jun. 29, 2023

(65) Prior Publication Data
US 2025/0033220 A1    Jan. 30, 2025

(51) Int. Cl.
*B25J 13/08* (2006.01)
*B25J 9/16* (2006.01)

(52) U.S. Cl.
CPC ........... *B25J 13/085* (2013.01); *B25J 9/1633* (2013.01); *B25J 13/088* (2013.01)

(58) Field of Classification Search
CPC ...... B25J 13/085; B25J 9/1633; B25J 13/088; B25J 9/1692; G05B 2219/40599

USPC ................ 700/245–264; 318/568.11–568.25
See application file for complete search history.

(56) References Cited

U.S. PATENT DOCUMENTS

| | | | | |
|---|---|---|---|---|
| 5,103,404 | A * | 4/1992 | McIntosh | G05B 19/4142 318/568.22 |
| 8,369,983 | B2 * | 2/2013 | Sato | B25J 9/1633 700/254 |
| 8,424,182 | B2 * | 4/2013 | Sato | B25J 9/1687 29/407.01 |
| 10,081,102 | B1 * | 9/2018 | Berkowitz | F16H 57/12 |
| 10,345,827 | B2 * | 7/2019 | Otsuji | G05B 19/19 |
| 10,682,771 | B2 * | 6/2020 | Ogata | B25J 17/0258 |
| 10,946,472 | B2 * | 3/2021 | Aoki | B23K 11/314 |

(Continued)

FOREIGN PATENT DOCUMENTS

| | | |
|---|---|---|
| JP | H08-171410 A | 7/1996 |
| JP | 2002-036164 A | 2/2002 |

(Continued)

*Primary Examiner* — Jaime Figueroa
(74) *Attorney, Agent, or Firm* — HAUPTMAN HAM, LLP

(57) ABSTRACT

A control device for a robot according to the present invention controls a drive motor for one specific drive shaft of the robot such that the torque output by a torque detector matches a torque setting value when rotation of a component member is inhibited by a rotation inhibiting unit. The control device acquires a rotational position output by a rotational position detector of the specific drive shaft once the torque matches the torque setting value. The control device generates mastering data in response to output by the rotational position detector on the basis of the rotational position of the drive motor output by the rotational position detector and predetermined mastering data design values.

8 Claims, 20 Drawing Sheets

(56) References Cited

U.S. PATENT DOCUMENTS

| | | | |
|---|---|---|---|
| 11,254,006 B2* | 2/2022 | Yamaoka | B25J 9/1692 |
| 11,305,422 B2* | 4/2022 | Kasai | B25J 13/088 |
| 11,358,276 B2* | 6/2022 | Nakayama | B25J 13/085 |
| 11,826,909 B2* | 11/2023 | Nakajima | B25J 13/085 |
| 2004/0169484 A1* | 9/2004 | Iribe | B25J 9/1633 |
| | | | 318/434 |
| 2005/0274880 A1* | 12/2005 | Atsuta | G01D 5/366 |
| | | | 250/231.13 |
| 2008/0312769 A1* | 12/2008 | Sato | B25J 9/1687 |
| | | | 901/31 |
| 2010/0057256 A1* | 3/2010 | Sato | B25J 13/085 |
| | | | 700/258 |
| 2011/0225787 A1* | 9/2011 | Sato | B25J 9/1687 |
| | | | 29/407.01 |
| 2013/0038265 A1* | 2/2013 | Igarashi | G05B 19/416 |
| | | | 318/469 |
| 2013/0096871 A1* | 4/2013 | Takahama | G01D 5/34792 |
| | | | 702/150 |
| 2013/0178868 A1* | 7/2013 | Roh | A61B 34/30 |
| | | | 606/130 |
| 2018/0178311 A1* | 6/2018 | Aoki | B23K 11/3063 |
| 2019/0009417 A1* | 1/2019 | Ogata | B25J 19/0029 |
| 2019/0091861 A1* | 3/2019 | Kasai | G05B 13/048 |
| 2019/0366537 A1* | 12/2019 | Nakajima | F16H 19/005 |
| 2020/0070341 A1* | 3/2020 | Nakayama | B25J 9/1612 |
| 2020/0070357 A1* | 3/2020 | Nakayama | B25J 13/085 |
| 2020/0147799 A1* | 5/2020 | Yamaoka | B25J 9/163 |

FOREIGN PATENT DOCUMENTS

| | | |
|---|---|---|
| JP | 2016-028842 A | 3/2016 |
| JP | 2016-221642 A | 12/2016 |

\* cited by examiner

CONTROL DEVICE FOR ROBOT PERFORMING MASTERING THROUGH TORQUE OR FORCE CONTROL

RELATED APPLICATIONS

The present application is a National Phase of International Application No. PCT/JP2021/047092 filed Dec. 20, 2021.

TECHNICAL FIELD

The present invention relates to a controller for a robot, the controller performing mastering by controlling a torque or a force.

BACKGROUND ART

A robot apparatus including a robot including joint parts can perform a work using a work tool while changing the position and orientation of the robot. The position and orientation of the robot is associated with the joint angle of each joint part. The joint angle of a joint part is associated with the output of an encoder attached to a drive motor.

In the prior art, it is known to perform mastering in order to accurately associate an output value of an encoder attached to a drive motor that drives each joint part with a design value (theoretical value). In the mastering, mastering data for converting the output value of the encoder into a machine pulse value used for the control of a robot is generated. The mastering data is equivalent to the origin position at a drive axis of the robot and corresponds to, for example, a position at which the output of the encoder is 0°.

A known method of performing mastering of a robot includes acquiring an output of an encoder when the position and orientation of the robot are set to a specific position and orientation for the mastering. For example, it is known to use a dedicated device for determining the position and orientation of a robot for adjustment to the position and orientation of the robot for mastering. The position and orientation of the robot is precisely adjusted. For example, a dedicated device with a dial gauge is attached to a constituent member of the robot. It is known that an operator manually operates the robot for generating the position and orientation for mastering.

Alternatively, a robot can be set to predetermined position and orientation based on an image captured by a camera attached to the robot. For example, a jig with a target is attached to a predetermined constituent member of the robot. The camera is attached to a wrist of the robot. It is known to precisely adjust a positional relationship between the camera and the target based on an image acquired by the camera so that the position and orientation of the robot are set to the position and orientation for mastering.

In recent years, it has been known that a force sensor is attached to a wrist of a robot in order to detect a force applied to a work tool so as to control the position and orientation the robot (e.g., Japanese Unexamined Patent Publication No. 2016-221642A). Further, a device and a control are known in which the position and orientation of a robot are adjusted based on an output of a force sensor so as to achieve the position and orientation of the robot for mastering (e.g., Japanese Unexamined Patent Publication No. 8-171410A).

CITATION LIST

Patent Literature

PTL 1: Japanese Unexamined Patent Publication No. 2016-221642A
PTL 2: Japanese Unexamined Patent Publication No. 8-171410A

SUMMARY OF INVENTION

Technical Problem

In the prior art, in order to achieve the position and orientation of the robot for mastering, an operator can manually drive the robot using a teach pendant. The operator needs to finely adjust the three-dimensional position and orientation of the robot. For this reason, the accuracy of the mastering depends on the skill level of the operator. A less-skilled operator has difficulty making fine adjustments to the position and orientation of the robot, which may result in less accurate mastering. Alternatively, the operator may make a mistake in setting mastering data. In addition, when a measuring device such as a camera is used, the accuracy of the mastering may be deteriorated due to the influence of disturbance light. As described above, the techniques in the prior art have a problem in that it is difficult to perform mastering with high accuracy by simple control.

Solution to Problem

A controller according to a first aspect of the present disclosure is a controller for a robot, the controller generating mastering data for the output of a rotational position detector attached to a drive motor for one specific drive axis that rotates a constituent member of the robot. The controller includes a torque detector that detects a torque about the specific drive axis. The controller includes a torque control unit that controls the drive motor for the specific drive axis such that a torque output from the torque detector becomes a predetermined torque setting value when the rotation of the constituent member about the specific drive axis is blocked by a rotation blocking part. The controller includes a rotational position acquisition unit that acquires a rotational position output by the rotational position detector of the specific drive axis when the torque output from the torque detector becomes the torque setting value. The controller includes a data generation unit that generates mastering data for the output of the rotational position detector arranged at the specific drive axis based on the rotational position of the drive motor output by the rotational position detector and a predetermined design value for the mastering data.

A controller according to a second aspect of the present disclosure is a controller for a robot, the controller generating mastering data for the output of a rotational position detector attached to a drive motor for one specific drive axis that rotates a constituent member of the robot. The controller includes a jig including a force detector, the jig preventing the rotation of the constituent member about the specific drive axis. The controller includes a force control unit that controls the drive motor for the specific drive axis such that a force output from the force detector becomes a predetermined force setting value when the rotation of the constituent member about the specific drive axis is blocked by the jig. The controller includes a rotational position acquisition unit that acquires a rotational position output by the rotational position detector for the specific drive axis when the force output from the force detector becomes the force setting value. The controller includes a data generation unit that generates mastering data for the output of the rotational position detector arranged at the specific drive axis based on the rotational position of the drive motor output by the rotational position detector and a predetermined design value for the mastering data.

Advantageous Effects of Invention

According to an aspect of the present disclosure, it is possible to provide a controller for a robot, the controller performing mastering with high accuracy by simple control.

DESCRIPTION OF EMBODIMENTS

A controller for a robot according to embodiments will be described with reference to FIG. 1 to FIG. 20. A controller for a robot according to the present embodiment drives a robot for each drive axis and generates mastering data for each drive axis. The controller for a robot generates mastering data for the output of a rotational position detector attached to a drive motor arranged at one drive axis.

Figure 1:
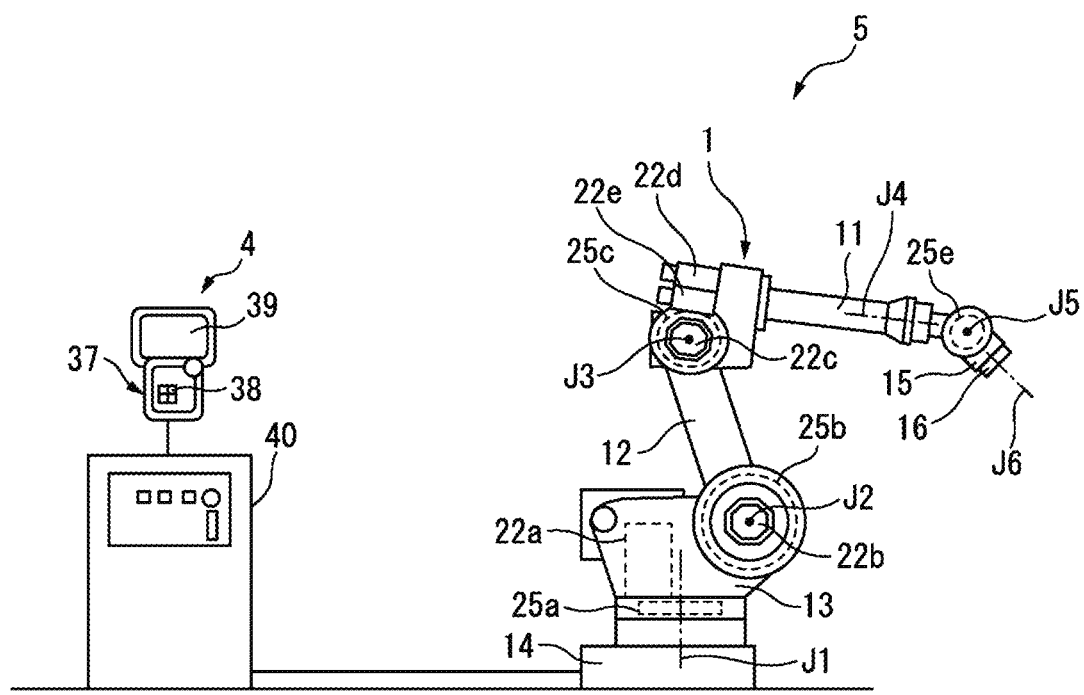
FIG. 1 is a side view of a first robot apparatus of an embodiment.
Figure 2:
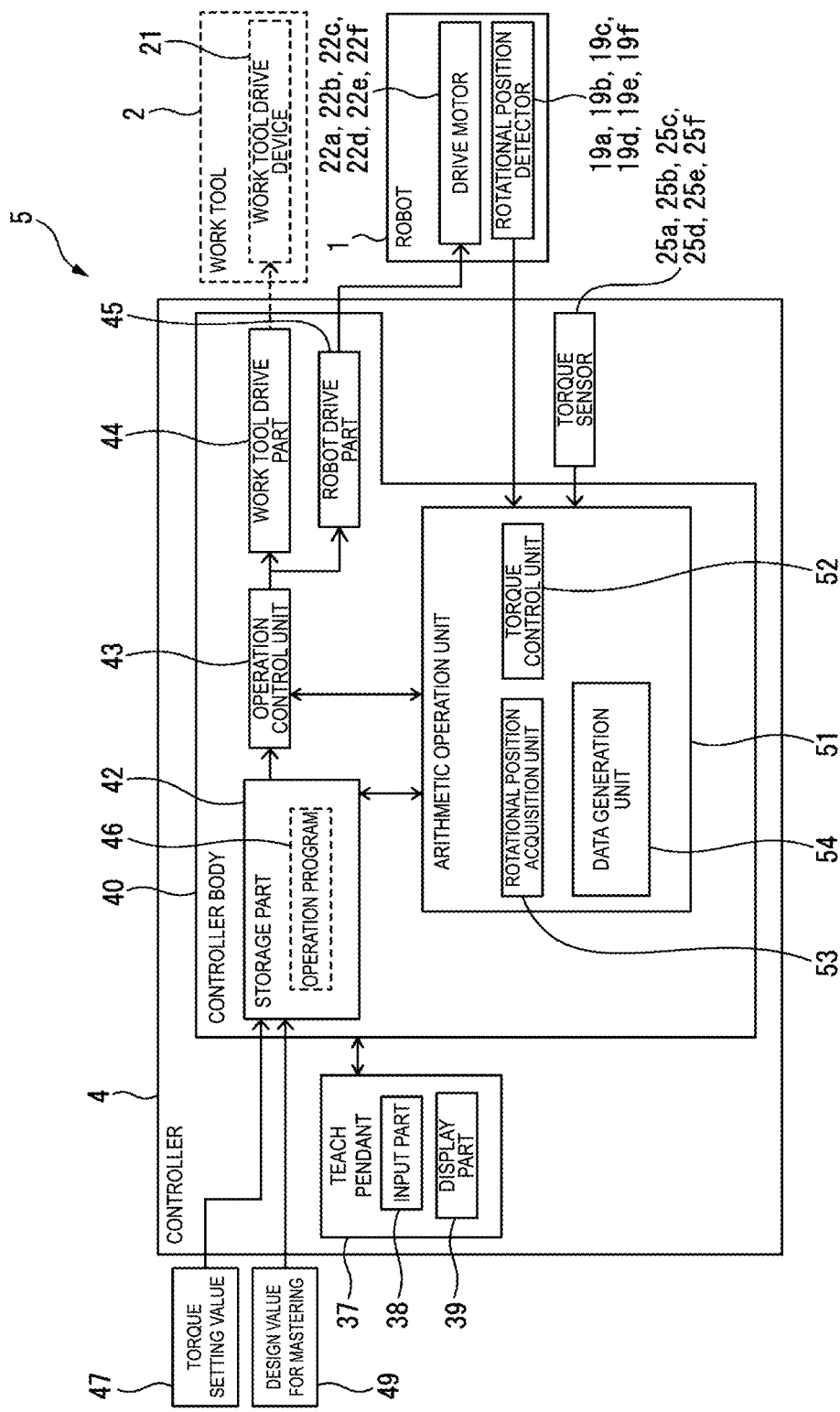
FIG. 2 is a block diagram of the first robot apparatus.

FIG. 1 is a schematic diagram of a first robot apparatus according to the present embodiment. FIG. 1 illustrates a state before a work tool is attached. FIG. 2 illustrates a block diagram of the robot apparatus according to the present embodiment. Referring to FIG. 1 and FIG. 2, a first robot apparatus 5 includes a robot 1 that moves a work tool 2. The robot 1 of the present embodiment is an articulated robot including a plurality of joint parts. In particular, the robot 1 of the present embodiment is a vertical articulated robot. The robot 1 includes a plurality of movable constituent members. The constituent members of the robot 1 are formed so as to rotate about respective drive axes.

The robot 1 includes a base part 14 fixed to an installation surface and a swivel base 13 supported by the base part 14. The swivel base 13 rotates about a first drive axis J1 with respect to the base part 14. The robot 1 includes an upper arm 11 and a lower arm 12. The lower arm 12 rotates about a second drive axis J2 with respect to the swivel base 13. The upper arm 11 rotates about a third drive axis J3 with respect to the lower arm 12. Further, the upper arm 11 rotates about a fourth drive axis J4 which is parallel to an extending direction of the upper arm 11.

The robot 1 includes a wrist 15 which is supported by the upper arm 11. The wrist 15 rotates about a fifth drive axis J5. Further, the wrist 15 includes a flange 16 that rotates about a sixth drive axis J6. The work tool 2 is fixed to the flange 16. In the present embodiment, the base part 14, the swivel base 13, the lower arm 12, the upper arm 11, the wrist 15, and the work tool 2 correspond to the constituent members of the robot apparatus 5.

The robot 1 of the present embodiment includes six drive axes, i.e., the drive axis J1 to the drive axis J6, but is not limited to this configuration. A robot that changes the position and orientation by any mechanism can be employed. As the work tool 2, a device according to work performed by the robot apparatus is employed.

A robot coordinate system, which is a coordinate system whose position is fixed and in which the directions of the coordinate axes are fixed, is set for the robot apparatus 5. The robot coordinate system is also referred to as a world coordinate system. Further, a flange coordinate system having the origin at the flange 16 of the wrist 15 is set for the robot apparatus 5. The flange coordinate system is a coordinate system that moves and rotates together with a surface of the flange 16. Furthermore, a tool coordinate system having the origin set at any position at the work tool is set for the robot apparatus 5. The tool coordinate system is a coordinate system that moves and rotates together with the work tool. The relative position and orientation of the tool coordinate system with respect to the flange coordinate system are constant and determined in advance. The position of the robot 1 corresponds to, for example, the position of the origin of the tool coordinate system in the robot coordinate system. The orientation of the robot 1 corresponds to the orientation of the tool coordinate system with respect to the robot coordinate system.

The robot 1 includes a robot drive device that changes the position and orientation of the robot 1. The robot drive device includes drive motors 22a to 22f that drive constituent members such as the arms and the wrist. In the present embodiment, a plurality of drive motors 22a to 22f are arranged so as to correspond to the plurality of drive axes J1 to J6. One drive motor is arranged for one drive axis. The robot apparatus 5 includes a work tool drive device 21 that drives the work tool 2. The work tool drive device 21 includes, for example, a motor, a cylinder, an electromagnetic valve, and the like for driving the work tool.

The robot apparatus 5 includes a controller 4 that controls the robot 1 and the work tool 2. The controller 4 includes a controller body 40 configured to perform a control, and a teach pendant 37 for an operator operating the controller body 40. The controller body 40 includes an arithmetic processing device (a computer) that includes a central processing unit (CPU) as a processor. The arithmetic processing device includes a random access memory (RAM) and a read only memory (ROM) connected to the CPU via a bus.

The teach pendant 37 is connected to the controller body 40 via a communication device. The teach pendant 37 includes an input part 38 for inputting information regarding the robot 1 and the work tool 2. The input part 38 includes input members, such as a keyboard and a dial. The teach pendant 37 includes a display part 39 that displays the information regarding the robot 1 and the work tool 2. The display part 39 may be composed of any display panel such as a liquid crystal display panel or an organic electro luminescence (EL) display panel.

An operation program 46 created in advance for operating the robot 1 and the work tool 2 is input to the controller 4. Alternatively, teaching points of the robot 1 can be set by the operator operating the teach pendant 37 and driving the robot 1. The controller 4 can generate the operation program 46 for the robot 1 and the work tool 2 based on the teaching points.

The controller body 40 includes an operation control unit 43 that controls the operation of the robot 1 and the work tool 2. The operation control unit 43 sends an operation command for driving the robot 1 to a robot drive part 45, based on the operation program 46. The robot drive part 45 includes an electric circuit that drives the drive motors 22a to 22f. The robot drive part 45 supplies electricity to the drive motors 22a to 22f, based on the operation command. Further, the operation control unit 43 sends the operation command for driving the work tool 2 to a work tool drive part 44 based on the operation program 46. The work tool drive part 44 includes an electric circuit that drives the work tool drive device 21. The work tool drive part 44 supplies electricity to the work tool drive device 21 based on the operation command.

The controller body 40 includes a storage part 42 that stores information regarding the control of the robot 1 and the work tool 2. The storage part 42 may be composed of a non-transitory storage medium capable of storing information. For example, the storage part 42 may be composed of a storage medium such as a volatile memory, a nonvolatile memory, a magnetic storage medium, or an optical storage medium. The operation program 46 is stored in the storage part 42.

The operation control unit 43 is equivalent to a processor that is driven in accordance with the operation program 46. The operation control unit 43 is formed so as to be able to read information stored in the storage part 42. The processor reads the operation program 46 and performs a control defined in the operation program 46, thereby functioning as the operation control unit 43.

The robot 1 includes rotational position detectors 19a to 19f for detecting the position and orientation of the robot 1. The rotational position detectors 19a to 19f according to the present embodiment are attached to the drive motors 22a to 22f for the respective drive axes. One rotational position detector is attached to one drive motor. The respective rotational position detectors 19a to 19f may be configured by an encoder for detecting a rotation angle of an output shaft of the respective drive motors 22a to 22f. Based on the outputs of the plurality of rotational position detectors 19a to 19f, the position and orientation of the robot 1 are detected.

The controller 4 of the first robot apparatus 5 includes torque sensors 25a to 25f serving as torque detectors for detecting torques about the drive axes J1 to J6 at the joint parts. In the present embodiment, the torque sensors 25a to 25f are arranged at all of the six drive axes J1 to J6. One torque sensor is arranged for one drive axis. As the torque sensors 25a to 25f, any sensors that can detect a torque, such as sensors including a strain gauge, can be employed. The torque sensor is arranged between one constituent member of the robot and another constituent member that rotates while being supported by the one constituent member of the robot. For example, the torque sensor is arranged between an output shaft of a reduction gear attached to the drive motor and a constituent member driven by the reduction gear.

As described above, in the robot 1 of the first robot apparatus 5, the drive motor, the rotational position detector, and the torque sensor are arranged for each drive axis. For example, the rotational position detector 19a that detects a rotational position is attached to the drive motor 22a that rotates the swivel base 13 about the drive axis J1. Further, the torque sensor 25a that detects a torque about the drive axis J1 is arranged.

In the present embodiment, mastering data of the robot is generated for each drive axis. In other words, mastering data is generated for the output of the rotational position detector attached to the drive motor arranged at each joint part. In the present embodiment, one drive axis for which mastering data is generated is referred to as a specific drive axis. The specific drive axis is determined in advance by an operator.

The controller body 40 includes an arithmetic operation unit 51 that performs force control of the robot 1 based on the output of the torque sensor arranged at the specific drive axis. The arithmetic operation unit 51 generates mastering data based on the output of the rotational position detector attached to the drive motor for the specific drive axis. The arithmetic operation unit 51 includes a torque control unit 52 that controls the drive motor such that a torque output from the torque sensor becomes a predetermined torque setting value 47. In particular, the torque control unit 52 controls the torque when the rotation of a constituent member of the robot about the specific drive axis is blocked by a rotation blocking part.

The arithmetic operation unit 51 includes a rotational position acquisition unit 53 that acquires a rotational position output by the rotational position detector for the specific drive axis when the torque becomes the torque setting value 47. The arithmetic operation unit 51 includes a data generation unit 54 that generates mastering data for the output of the rotational position detector arranged at the specific drive axis. The data generation unit 54 generates the mastering data based on the rotational position of the drive motor output by the rotational position detector and a predetermined design value 49 of mastering data.

The design value 49 for mastering, which is a theoretical value of a rotation angle of each drive axis for performing mastering, is determined in advance. The design value 49 for mastering for the output of the rotational position detector attached to each drive motor is stored in the storage part 42. The design value 49 for mastering is generated for each of the rotational position detectors 19a to 19f.

The arithmetic operation unit 51, the torque control unit 52, the rotational position acquisition unit 53, and the data generation unit 54 correspond to a processor that is driven in accordance with the operation program 46. The processor functions as each unit by reading the operation program 46 and performing the control defined in the operation program 46.

In the present embodiment, in order to detect the rotational positions of the output shafts of the drive motors 22a to 22f, the rotational position detectors 19a to 19f are arranged at the drive axes J1 to J6 of the robot 1, respectively. For each of the drive axes J1 to J6, a machine pulse value, which is a rotational position of the drive motor used for controlling the robot, is defined by the following equation (1).

$$\text{(Machine pulse value)} = \text{(an output value of the rotational position detector)} - \text{(mastering data)}. \quad (1)$$

In mastering operation, mastering data is calculated. The mastering data indicates a rotational position corresponding to the position of the origin of the robot. When an output value of the rotational position detector becomes equal to the mastering data, the machine pulse value becomes 0. The machine pulse value used for controlling the robot can be calculated by subtracting the mastering data from the output value of the rotational position detector.

For example, a joint angle of each drive axis (joint part) can be calculated based on a machine pulse value and a gear ratio of a reduction gear. Then, coordinate values of the position and orientation of the robot in the robot coordinate system can be calculated by forward kinematics conversion based on the joint angle of each joint part. Alternatively, a joint angle of each joint part can be calculated by inverse kinematics conversion based on the position and orientation of the robot defined in the operation program. Then, a machine pulse value can be calculated based on the joint angle and a gear ratio of a reduction gear. The controller can control the rotational position of the drive motor so as to achieve this machine pulse value.

In the present embodiment, the robot is driven about one specific drive axis of the robot. Then, the rotation of the robot is blocked by the rotation blocking part such as a stopper or a jig. The torque control unit 52 performs control of pressing a constituent member at the predetermined torque setting value 47. The design value 49 for mastering, which is a theoretical value of the output of the rotational position detector at this time, is determined in advance. The mastering data can be calculated by the following equation (2).

$$\text{(Mastering data)} = \text{(the output value of the rotational position detector when a constituent member of the robot is pressed)} - \text{(the theoretical value of the output of the rotational position detector)} \quad (2)$$

In the control of the present embodiment, highly accurate mastering can be performed. In the mastering operation according to the present embodiment, the drive motors for the drive axes other than the specific drive axis are not driven and maintain the predetermined rotational positions. The joint angles at the drive axes other than the specific drive axis are maintained at predetermined angles. Then, the drive motor for the specific drive axis is driven. For this reason, it is preferable to perform mastering with low accuracy before performing the mastering of the present embodiment. For example, it is possible to preliminary perform precise mastering and form a linear scribing line across a boundary portion between adjacent constituent members of the robot. The linear scribing line can be formed such that the rotational position of one constituent member relative to the other is known. The scribing line may be formed for each joint part.

An operator manually controls the position and orientation of the robot using the teach pendant such that the scribing line of one constituent member and the scribing line of the other constituent member are aligned. When the scribing lines are aligned at every joint part, the position and orientation for mastering is achieved. At this time, rough mastering can be performed based on the output of the rotational position detector and a design value (theoretical value) of a rotational position. Then, highly accurate mastering of the present embodiment can be performed.

Figure 3:
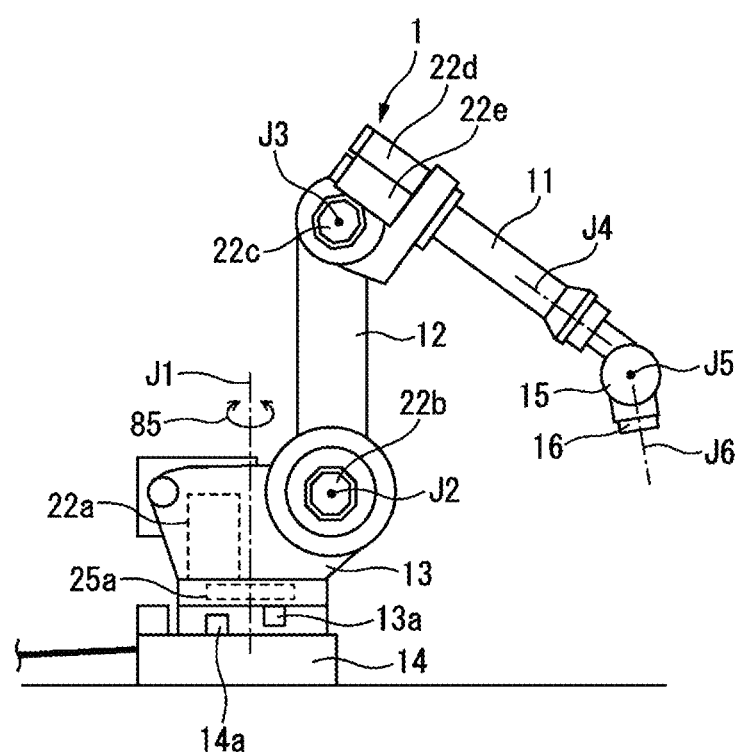
FIG. 3 is a side view of a robot and illustrates a first control of the first robot apparatus.

FIG. 3 is a side view of the robot and illustrates a first control of the first robot apparatus according to the present embodiment. In the first control, the drive axis J1 is selected as the specific drive axis. In the first control, mastering of the drive axis J1 is performed. In other words, mastering data for the output of the rotational position detector 19a arranged at the drive axis J1 is generated.

The base part 14 corresponds to a first constituent member of the robot 1, and the swivel base 13 corresponds to a second constituent member that rotates about the specific drive axis with respect to the first constituent member as indicated by an arrow 85. A stopper part 13a of the swivel base 13 and a stopper part 14a of the base part 14 are formed so as to prevent excessive rotation when the swivel base 13 rotates about the drive axis J1. In other words, these are formed so as to restrict the rotation angle of the swivel base 13 (the range of the joint angle of the drive axis J1).

In the first control, the rotation blocking part that prevents the rotation of the swivel base 13 includes the stopper part 14a as a contact portion arranged at the base part 14 and the stopper part 13a as a contact portion arranged at the swivel base 13. The rotation blocking part is formed such that when the swivel base 13 rotates as indicated by the arrow 85, the stopper part 13a comes into contact with the stopper part 14a so as to block the rotation of the swivel base 13.

Figure 4:
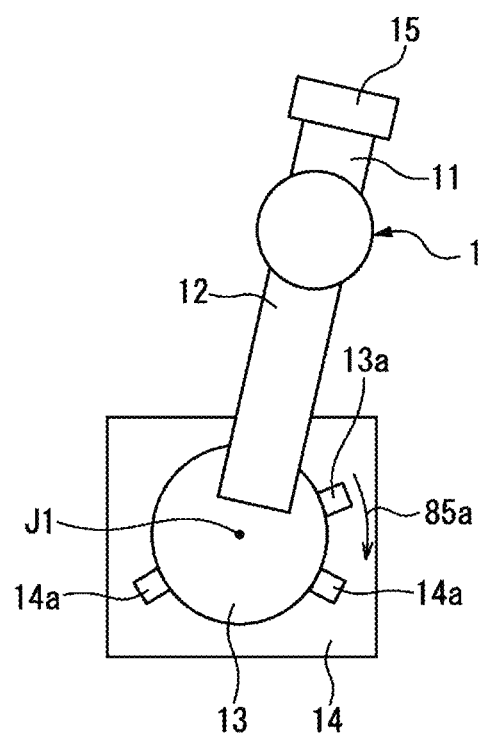
FIG. 4 is a schematic plan view of the robot and illustrates the first control of the first robot apparatus.

FIG. 4 is a schematic plan view of the robot and illustrates the first control of the first robot apparatus. Referring to FIG. 2 to FIG. 4, for the purpose of mastering, the torque control unit 52 drives the drive motor 22a so as to rotate the swivel base 13 in one direction as indicated by an arrow 85a. When the swivel base 13 is rotated, the other drive motors 22b to 22f are stopped. In other words, the joint angles of the other drive axes J2 to J6 are maintained at predetermined angles.

When the stopper part 13a comes into contact with the stopper part 14a, the rotation of the swivel base 13 is blocked. The torque control unit 52 acquires a torque from the torque sensor 25a. The torque control unit 52 controls the drive motor 22a such that the torque output from the torque sensor 25a when the rotation of the swivel base 13 is blocked becomes the predetermined torque setting value 47. The torque setting value 47 at this time is determined in advance and stored in the storage part 42.

Any method can be employed as a method by which the torque control unit 52 controls a torque applied to a constituent member. It is preferable to perform control of reducing the rotation speed of the drive motor as the torque detected by the torque sensor 25a comes close to a target value of the torque. For example, the torque control unit 52 can perform damping control as force control. In the damping control, a speed command v is calculated by dividing a difference between a current force F and a predetermined target force Fd by a predetermined damper coefficient D. The equation of the damping control can be expressed by the following equation (3).

$$v = (F - Fd)/D \qquad (3)$$

The torque control unit 52 can calculate a force by dividing a torque acquired from the torque sensor 25a by a predetermined rotation radius from a rotation center to a contact point. For example, the force F applied to the stopper part 13a can be calculated by dividing an output of the torque sensor 25a by a distance from the drive axis J1 to the stopper part 13a. Then, the damping control of the above-described equation (3) can be performed based on the force F calculated from the torque acquired from the torque sensor 25a.

The torque control unit 52 sends the speed command v for the drive motor 22a to the operation control unit 43. The operation control unit 43 can control the drive motor 22a for the drive axis J1 based on the command from the torque control unit 52.

The speed command v may be calculated by using an equation obtained by changing the target force Fd to a target torque and changing the current force F to a current torque in the equation (3). In the present embodiment, the torque sensors 25a to 25f are arranged at all of the drive axes J1 to J6. Thus, a force at a contact point between the stopper parts may be calculated based on all the outputs of the torque sensors 25a to 25f. Then, the speed command for the drive motor 22a may be calculated based on the force at the contact point.

Next, when the torque output from the torque sensor 25a becomes the torque setting value 47, the rotational position acquisition unit 53 acquires a rotational position output from the rotational position detector 19a of the drive axis J1. The data generation unit 54 generates mastering data for the output of the rotational position detector 19a arranged at the drive axis J1 based on the above equation (2). The data generation unit 54 generates the mastering data based on the rotational position of the drive motor 22a output by the rotational position detector 19a and the predetermined design value 49 of the mastering data. The storage part 42 stores the mastering data for the drive axis J1 generated by the data generation unit 54.

When the position and orientation of the robot 1 are controlled during actual work of the robot apparatus, a machine pulse value calculated from the mastering data is used as indicated in the equation (1). As a result, the robot can be driven so as to accurately correspond to the design value of the robot. In other words, the position and orientation of the robot can be accurately controlled so as to correspond to the position and orientation of the robot in the design.

The controller according to the present embodiment can perform mastering by the torque sensor arranged at each drive axis. In the present embodiment, one constituent member of the robot is rotated and the rotation is blocked by the rotation blocking part. At this time, the torque control unit controls a torque so as to press a predetermined member at a torque setting value. This control ensures that the members blocking the rotation are in close contact with each other to achieve the exact position and orientation of the robot. In the present embodiment, mastering data is generated based on the rotational position when a predetermined force acts on the pressing portion of the predetermined member. Thus, precise mastering can be performed.

The controller for a robot according to the present embodiment can accurately generate mastering data by simple control. Highly accurate mastering can be performed regardless of the skill of an operator. In particular, since the arithmetic operation unit 51 automatically performs mastering operation, the mastering can be easily performed, and an operational error or the like by the operator can be prevented.

In addition, the controller of the present embodiment can perform mastering for each drive axis. Instead of performing mastering on all the drive axes, mastering can be performed on the outputs of the rotational position detectors of the drive motors for some of the drive axes. For example, when some of the drive motors or some of the rotational position detectors are replaced, mastering can be performed for the drive axes of the replaced part. Alternatively, after low-precision mastering such as mastering using a scribing line is performed, the control of the present embodiment can be performed for a drive axis for which the highly accurate mastering is desired.

In the first control of the first robot apparatus, mastering for the drive axis J1 has been described, but the embodiment is not limited to this. For the other drive axes J2 to J6, the same control as the first control can be performed when stopper parts that restrict rotation ranges are arranged. Alternatively, the stopper part may be arranged at each robot so as to restrict the rotation angle at which the robot is driven.

In this regard, when the robot 1 is driven, the outputs of the drive motors 22a to 22f are decelerated by reduction gears and then transmitted to each constituent member. In each reduction gear, a plurality of gears are meshed with each other. Thus, there is an influence of play (backlash) in a meshing portion between the gears. Next, control of correcting the influence of backlash in the first control will be described.

Referring to FIG. 4, the torque control unit 52 rotates the swivel base 13 in a direction indicated by the arrow 85a as a first direction. The rotational position acquisition unit 53 detects a first rotational position when the rotation of the swivel base 13 in the first direction is blocked. The rotational position acquisition unit 53 detects the first rotational position when the stopper part 13a is pressed against one stopper part 14a of the base part 14.

Figure 5:
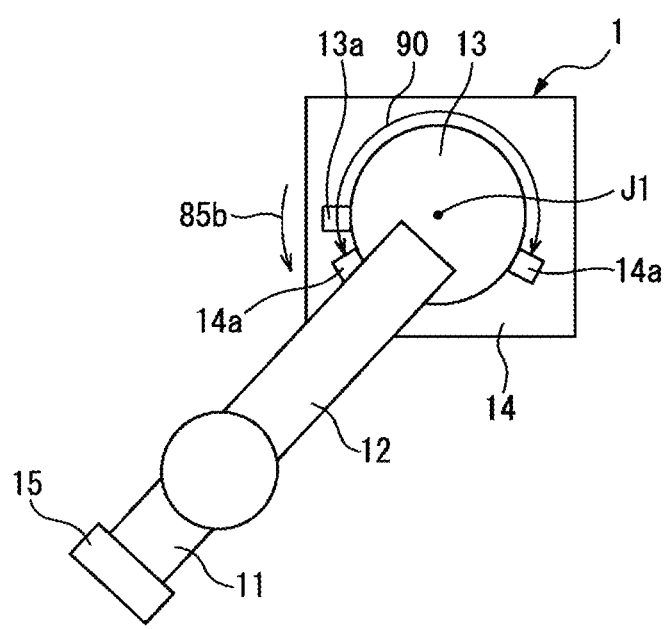
FIG. 5 is another schematic plan view of the robot and illustrates the first control of the first robot apparatus.

FIG. 5 illustrates another schematic plan view in the first control of the first robot apparatus. Next, the torque control unit 52 rotates the swivel base 13 in a direction indicated by an arrow 85b as a second direction opposite to the first direction. The stopper part 13a comes into contact with the other stopper part 14a so as to block the rotation. Also in this case, the torque control unit 52 controls the stopper part 13a to be pressed against the stopper part 14a such that the torque setting value 47 is achieved. The rotational position acquisition unit 53 detects a second rotational position when the rotation of the swivel base 13 in the second direction is blocked. The rotational position acquisition unit 53 detects the second rotational position when the stopper part 13a is pressed against the stopper part 14a. Next, the data generation unit 54 calculates a correction value for the mastering data based on the first rotational position and the second rotational position.

Figure 6:
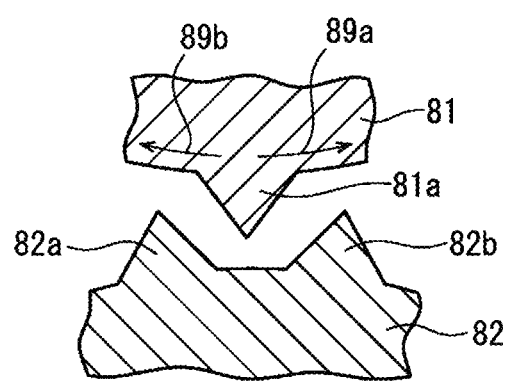
FIG. 6 is a first enlarged cross-sectional view of a gear meshing portion.

FIG. 6 illustrates a schematic cross-sectional view of the meshing portion between the gears of the reduction gear. FIG. 6 illustrates a portion at which one gear 81 and another gear 82 of the reduction gear mesh with each other. In this example, a tooth 81a of the gear 81 engages with teeth 82a and 82b of the gear 82. An arrow 89a corresponds to the first direction in which the base part 14 is rotated. An arrow 89b corresponds to the second direction in which the base part 14 is rotated.

Figure 7:
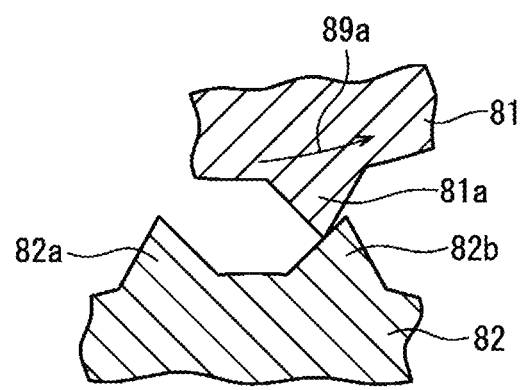
FIG. 7 is a second enlarged cross-sectional view of the gear meshing portion.
Figure 8:
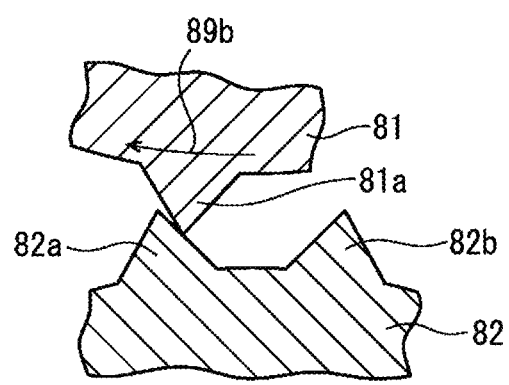
FIG. 8 is a third enlarged cross-sectional view of the gear meshing portion.

FIG. 7 illustrates an enlarged cross-sectional view when the gear is rotated in the first direction. FIG. 8 illustrates an enlarged schematic cross-sectional view when the gear is rotated in the second direction. Referring to FIG. 6 to FIG. 8, when the gear 81 is rotated in the direction indicated by the arrow 89a, the tooth 81a comes into contact with the tooth 82b. By rotating the gear 81 in the direction indicated by the arrow 89b, the tooth 81a comes into contact with the tooth 82a. There may be a case in which the gear 82 is not rotated due to the influence of backlash even when the gear 81 is rotated.

Referring to FIG. 4 and FIG. 5, in the present embodiment, the arithmetic operation unit 51 detects the first rotational position when the swivel base 13 is rotated in the first direction indicated by the arrow 85a. The arithmetic operation unit 51 detects the second rotational position when the swivel base 13 is rotated in the second direction indicated by the arrow 85b.

The data generation unit 54 calculates a rotation angle for the rotation from the first rotational position to the second rotational position as indicated by an arrow 90. An angle obtained by subtracting, from a rotation angle when the swivel base 13 is actually rotated, a design value of the rotation angle corresponds to a rotation angle δ of the backlash. A difference between the rotation angles illustrated in FIG. 7 and FIG. 8 corresponds to the rotation angle δ of the backlash.

When a rotational position output from the rotational position detector rotates in a negative direction, the rotational position is output as being smaller due to the backlash, and thus δ/2 can be added to a machine pulse value. The data generation unit 54 can subtract δ/2 from the mastering data. On the other hand, when the rotational position from the rotational position detector rotates in a positive direction, the rotational position is output as being larger, and thus δ/2 can be subtracted from a machine pulse value. In other words, the data generation unit 54 can add δ/2 to the mastering data. In this way, the arithmetic operation unit 51 can calculate a correction value for an output pulse value by the above equation (1). Accordingly, the arithmetic operation unit 51 can calculate a correction value for the mastering data.

In this way, by performing pressing twice in mutually opposite directions, a correction value for the mastering data relating to backlash can be calculated. Pressing of the constituent member of the robot or pressing of the jig supported by the robot can be performed by two rotations, i.e., the rotation in the positive direction and the rotation in the negative direction, but may be repeated three times or more.

Figure 9:
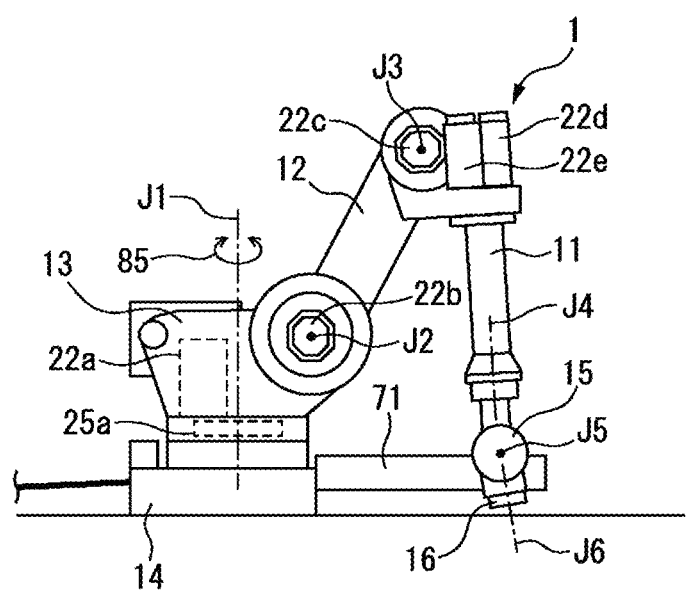
FIG. 9 is a side view of a robot and illustrates a second control of the first robot apparatus.

FIG. 9 is a side view of the robot and illustrates a second control of the first robot apparatus according to the present embodiment. In the second control to a sixth control of the first robot apparatus to be described below, as the rotation blocking part, a jig for blocking the rotation of a constituent member of the robot 1 is arranged. In the second control, the drive axis J1 is selected as the specific drive axis. The torque control unit 52 rotates the swivel base 13 as a second constituent member with respect to the base part 14 as a first constituent member. The swivel base 13 is rotated about the drive axis J1 in a direction indicated by the arrow 85.

Figure 10:
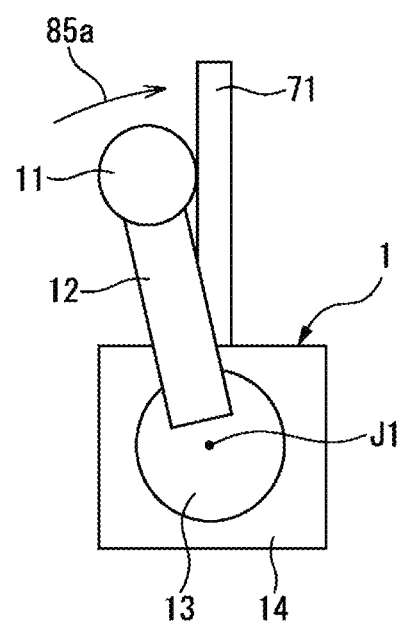
FIG. 10 is a schematic plan view of the robot and illustrates the second control of the first robot apparatus.

FIG. 10 is a schematic plan view of the robot and illustrates the second control of the first robot apparatus.

Referring to FIG. 9 and FIG. 10, the rotation blocking part includes a jig 71 fixed to the base part 14 as the first constituent member. The jig 71 is fixed to a member that is stationary when the robot is driven. The jig 71 is formed in a rod shape. For example, the jig 71 is formed in a columnar shape. The jig 71 is arranged so as to come into contact with the wrist 15 when the swivel base 13 is rotated. When the jig 71 comes into contact with the wrist 15, the rotation of the swivel base 13 is blocked. Preferably, the position at which the jig 71 is fixed and the orientation of the jig 71 are precisely adjusted.

The torque control unit 52 rotates the swivel base 13 together with the lower arm 12, the upper arm 11, and the wrist 15 in a direction indicated by the arrow 85a as a first rotation direction. The rotational positions of the drive motors 22b to 22f at the other drive axes J2 to J6 when the swivel base 13 is rotated are determined in advance. The joint angles of the drive axes J2 to J6 other than the drive axis J1 which is the specific drive axis are fixed.

The torque control unit 52 controls the drive motor 22a such that a torque detected by the torque sensor 25a when the wrist 15 comes into contact with the jig 71 becomes the torque setting value 47. When the torque detected by the torque sensor 25a becomes the torque setting value, the rotational position acquisition unit 53 acquires a first rotational position from the rotational position detector 19a. Then, the data generation unit 54 can generate mastering data based on the first rotational position of the drive motor 22a and the design value 49 of the mastering data.

Figure 11:
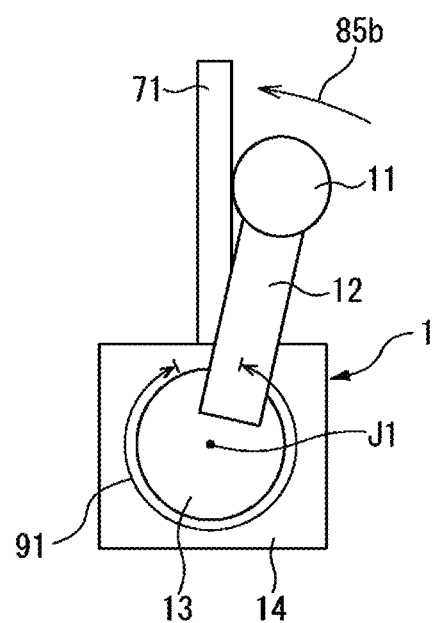
FIG. 11 is another schematic plan view of the robot and illustrates the second control of the first robot apparatus.

FIG. 11 is another schematic plan view of the robot and illustrates the second control of the first robot apparatus. Also in the second control, a correction value for the mastering data can be calculated in consideration of the influence of backlash. The torque control unit 52 rotates the swivel base 13 in a second direction opposite to the first direction. The torque control unit 52 rotates the swivel base 13 in the direction of the arrow 85b as the second direction so as to press the wrist 15 against the jig 71 at the torque setting value 47. The rotational position acquisition unit 53 acquires a second rotational position from the rotational position detector 19a.

The rotational position acquisition unit 53 acquires the first rotational position when the rotation in the first direction illustrated in FIG. 10 is blocked and acquires the second rotational position when the rotation in the second direction illustrated in FIG. 11 is blocked. As in the case of the first control, the data generation unit 54 calculates a correction value for the mastering data based on the first rotational position and the second rotational position. The data generation unit 54 can calculate the correction value for the mastering data relating to the backlash based on a difference between the rotation angle from the first rotational position to the second rotational position indicated by an arrow 91 and a theoretical value of the rotation angle. Other controls, actions, and effects are the same as those of the first control.

Figure 12:
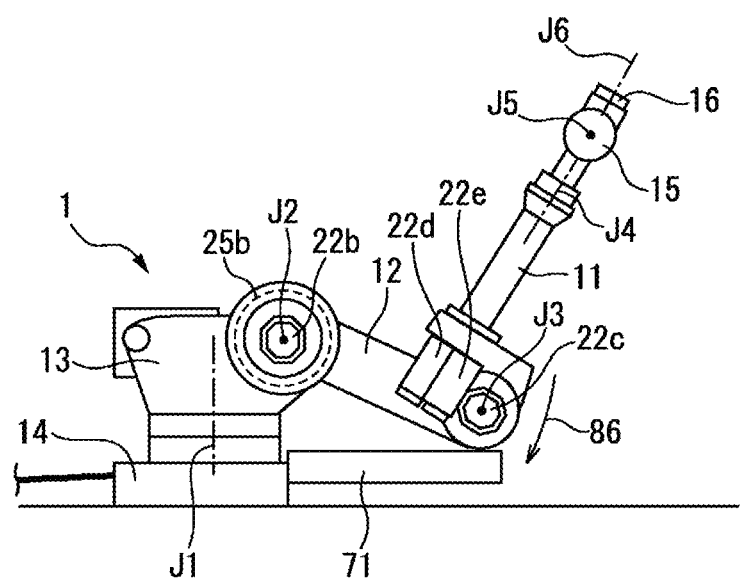
FIG. 12 is a side view of a robot and illustrates a third control of the first robot apparatus.

FIG. 12 is a side view of the robot and illustrates a third control of the first robot apparatus. In the third control, the second drive axis J2 is selected as the specific drive axis. In the third control, mastering data is generated for the output of the rotational position detector 19b attached to the drive motor 22b arranged at the drive axis J2. Also in the third control, the jig 71 is fixed to the base part 14 as in the second control.

In the third control, the torque control unit 52 changes the position and orientation of the robot 1 such that the upper arm 11 and the wrist 15 face upward with respect to the lower arm 12. The joint angles of the drive axes J1 and J3 to J6 are determined in advance. The torque control unit 52 does not drive the drive motors 22a and 22c to 22f at the drive axis J1 and J3 to J6, but keep them in a stopped state. The torque control unit 52 drives the drive motor 22b of the drive axis J2. As indicated by an arrow 86, the torque control unit 52 brings the lower arm 12 into contact with the jig 71. Then, the torque control unit 52 controls the drive motor 22b such that a torque output from the torque sensor 25b becomes the predetermined torque setting value 47.

Next, the rotational position detector 19b detects a rotational position when the lower arm 12 is pressed against the jig 71. Then, the data generation unit 54 can generate mastering data based on this rotational position and the design value 49 for mastering. Other controls, actions, and effects are the same as those of the first control.

Figure 13:
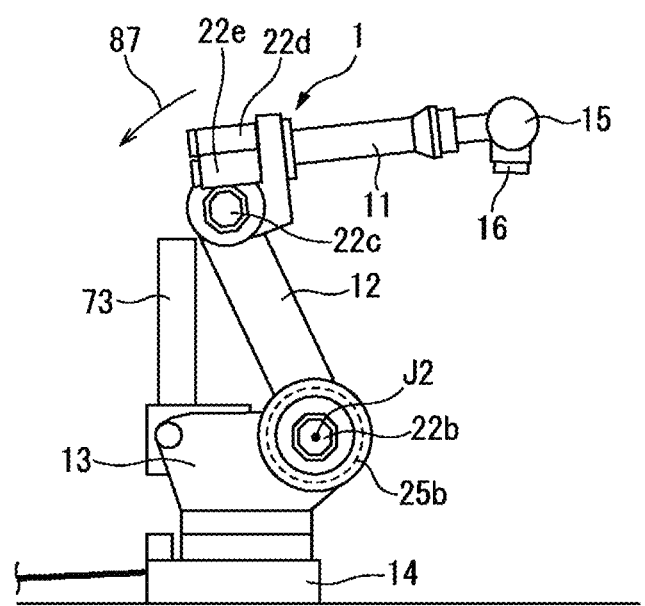
FIG. 13 is a side view of a robot and illustrates a fourth control of the first robot apparatus.

FIG. 13 is a side view of the robot and illustrates a fourth control of the first robot apparatus. The jig for blocking the rotation of a constituent member about one specific drive axis is not limited to an immovable jig, and may move together with the driving of the robot. In the fourth control, the second drive axis J2 is selected as the specific drive axis.

In the fourth control, a jig 73 is fixed to the swivel base 13. The position and orientation of the jig 73 are precisely adjusted. The jig 73 moves together with the swivel base 13. The jig 73 is formed in a rod shape. As indicated by an arrow 87, the torque control unit 52 rotates the lower arm 12 by driving the drive motor 22b arranged at the drive axis J2. At this time, the joint angles of the other drive axes J1 and J3 to J6 are kept constant. In a state in which the torque control unit 52 presses the lower arm 12 against the jig 73 at the predetermined torque setting value 47, the rotational position acquisition unit 53 acquires a rotational position output from the rotational position detector 19b. The data generation unit 54 generates mastering data for the output of the rotational position detector 19b arranged at the drive axis J2. In this way, the jig that blocks the rotation of a constituent member of the robot at the specific drive axis may move together with the constituent member of the robot. Other controls, actions, and effects are the same as those of the first control.

Figure 14:
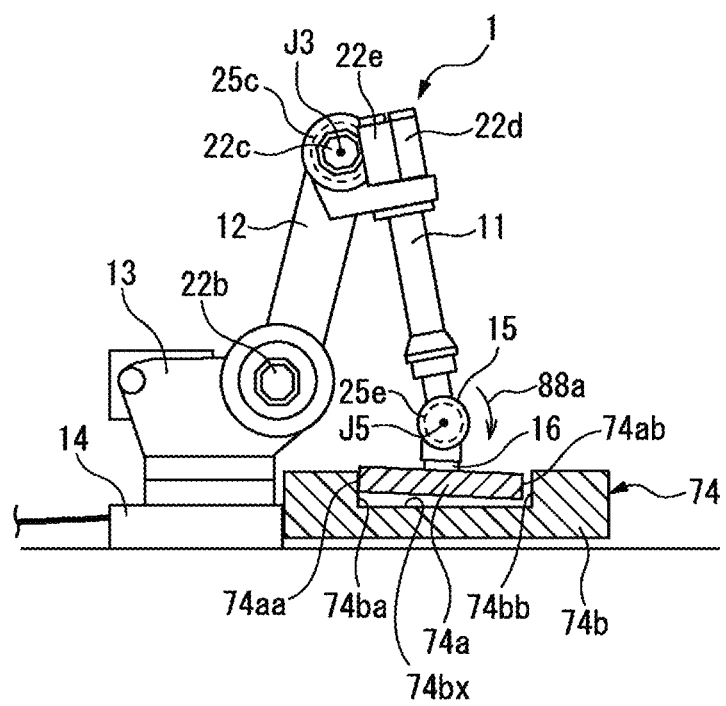
FIG. 14 is a side view of a robot and illustrates a fifth control of the first robot apparatus.

FIG. 14 is a side view of the robot and illustrates a fifth control of the first robot apparatus. In the fifth control, the fifth drive axis J5 is selected as the specific drive axis. In the fifth control, mastering data is generated for the output of the rotational position detector 19e of the drive motor 22e arranged at the drive axis J5.

In the fifth control, a jig 74 including a first member 74a and a second member 74b is used. The first member 74a is a plate-like member having a quadrangular planar shape. The first member 74a is fixed to the flange 16 of the wrist 15. The surface having the maximum area of the first member 74a is fixed to the flange 16. The position and orientation of the first member 74a can be changed by the robot 1.

On the other hand, the second member 74b is an immovable member. The second member 74b is fixed to the base part 14. The position and orientation of the second member 74b are precisely adjusted. Alternatively, the second member 74b may be fixed to an installation surface of the robot 1. The upper surface of the second member 74b is formed with a recess 74bx having a quadrangular planar shape. The first member 74a has a size that allows it to be arranged inside the recess 74bx.

In the fifth control, the torque control unit 52 rotates the wrist 15 about the drive axis J5 in a direction of an arrow 88a as a first direction. The joint angles of the other drive axes J1 to J4 and J6 are kept constant. The torque control unit 52 brings an end surface 74aa of the first member 74a into contact with a side surface 74ba of the recess 74bx of the second member 74b. The torque control unit 52 presses, based on the output of the torque sensor 25e, the first member 74a at the predetermined torque setting value 47. At this time, the rotational position acquisition unit 53 acquires a first rotational position from the rotational position detector 19e. Then, the data generation unit 54 can generate mastering data for the output of the rotational position detector 19e, based on the output of the rotational position detector 19e and the design value 49 for mastering.

Figure 15:
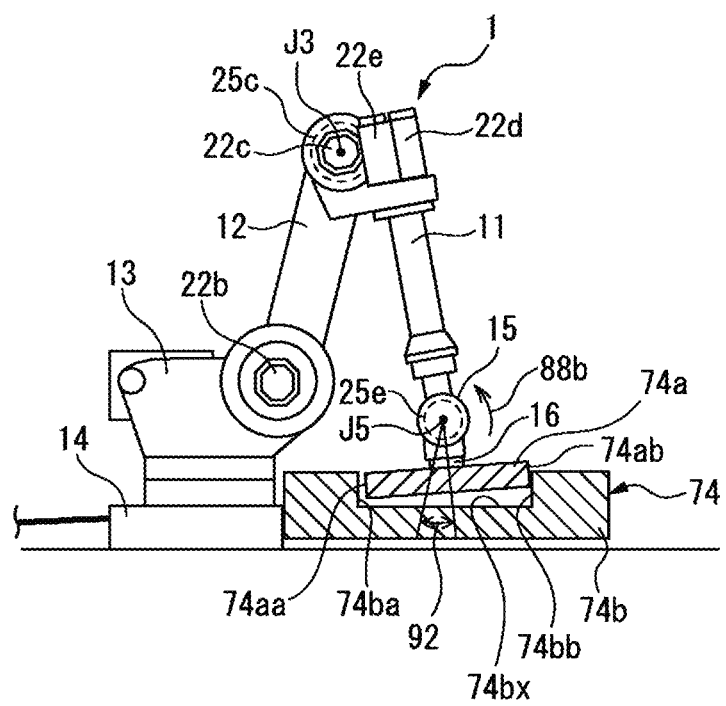
FIG. 15 is another side view of the robot and illustrates the fifth control of the first robot apparatus.

FIG. 15 is another side view of the robot and illustrates the fifth control of the first robot apparatus. The planar shape of the recess 74bx of the second member 74b is formed to be slightly larger than the planar shape of the first member 74a. Also in the fifth control, a correction value for the mastering data can be calculated in consideration of the influence of backlash.

The torque control unit 52 rotates the wrist 15 in a direction indicated by an arrow 88b as a second direction opposite to the first direction. An end surface 74ab of the first member 74a comes into contact with a side surface 74bb of the recess 74bx of the second member 74b. In a state in which the first member 74a is pressed at the torque setting value 47, the rotational position acquisition unit 53 acquires a second rotational position of the rotational position detector 19e. The data generation unit 54 calculates a rotation angle from the first rotational position to the second rotational position as indicated by an arrow 92. The data generation unit 54 can calculate, based on a difference between the actual measurement value and the design value (theoretical value) of the rotation angle, a rotation angle (δ/2) which is a correction value for the rotation angle relating to backlash.

In this way, also in the fifth control, a correction value relating to backlash can be calculated by rotating the wrist 15 in the first direction and the second direction opposite to the first direction. Other controls, actions, and effects are the same as those of the first control.

In the fifth control, the mastering data for the fifth drive axis J5 is generated. However, mastering data for the third drive axis J3 can be generated by similar control. In other words, by driving the drive motor 22c while keeping constant the joint angles of the drive axes J1, J2, and J4 to J6 other than the drive axis J3, the first member 74a of the jig 74 is pressed against the recess 74bx of the second member 74b. Then, by detecting the rotational position of the rotational position detector 19c attached to the drive motor 22c, the mastering data for the output of the rotational position detector 19c can be generated.

Figure 16:
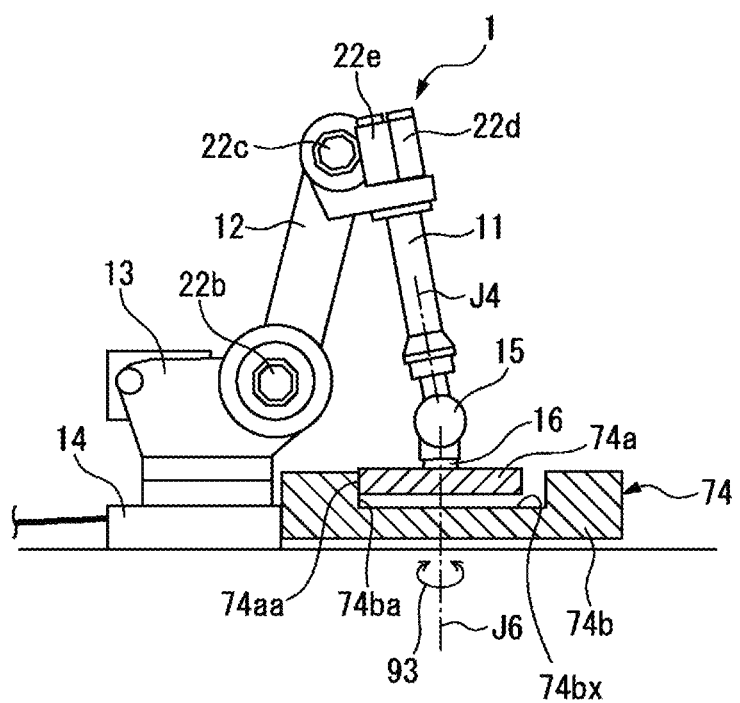
FIG. 16 is a side view of a robot and illustrates a sixth control of the first robot apparatus.

FIG. 16 is a side view of the robot and illustrates a sixth control of the first robot apparatus. Also in the sixth control, the jig 74 including the first member 74a and the second member 74b is used. In the sixth control, the sixth drive axis J6 is selected as the specific drive axis. In the sixth control, mastering data is generated for the output of the rotational position detector 19f of the drive motor 22f arranged at the drive axis J6.

In the sixth control, the surface having the maximum area of the first member 74a is arranged so as to extend in the horizontal direction. The side surface 74ba of the recess 74bx of the second member 74b and the end surface 74aa of the first member 74a are formed in a planar shape. The torque control unit 52 brings the end surface 74aa into surface contact with the side surface 74ba. Alternatively, the first member 74a may be arranged at a predetermined position and orientation such that a clearance is formed between the side surface 74*ba* and the end surface 74*aa*.

The torque control unit 52 rotates the first member 74*a* in a first direction which is one of the directions indicated by an arrow 93. The joint angles of the other drive axes J1 to J5 are kept constant. The torque control unit 52 performs control of pressing the first member 74*a* against the second member 74*b* at the torque setting value 47. The torque control unit 52 controls the drive motor 22*f* such that a torque detected by the torque sensor 25*f* becomes the predetermined torque setting value 47. The rotational position acquisition unit 53 acquires a first rotational position, and the data generation unit 54 can generate mastering data for the output of the rotational position detector 19*f* based on the first rotational position.

Further, the torque control unit 52 rotates the first member 74*a* in a second direction which is the other direction of the directions indicated by the arrow 93. During a period in which the torque control unit 52 performs the control of pressing the first member 74*a* at the torque setting value 47, the rotational position acquisition unit 53 acquires a second rotational position. The data generation unit 54 can calculate a correction value relating to backlash based on a rotation angle from the first rotational position to the second rotational position. Other controls, actions, and effects are the same as those of the first control.

In the sixth control, the mastering data for the sixth drive axis J6 is generated, but the embodiment is not limited to this. Mastering data for the J4 axis can also be generated by similar control. The arithmetic operation unit 51 drives the drive motor 22*d* so as to press the end surface 74*aa* of the first member 74*a* against the side surface 74*ba* of the recess 74*bx* of the second member 74*b*. Then, the arithmetic operation unit 51 can generate mastering data for the rotational position detector 19*d* based on the output of the rotational position detector 19*d*.

In this way, in the fifth control and the sixth control, the mastering data for the drive axes J3 to J5 can be generated by using the jig 74. The first member of the jig 74 can have any shape. The recess of the second member can have any shape. Instead of the first member 74*a* having a quadrangular planar shape, a first member having a spherical shape may be employed. Instead of the recess 74*bx* having a quadrangular planar shape of the second member 74*b*, a recess having a hemispherical shape may be formed. With this configuration, mastering data for the drive axis J1 and J2 can be generated. In a state in which the first member is pressed against the recess of the second member, rotational positions output by the respective drive motors 22*a* and 22*b* can be acquired. The mastering data can be generated based on the rotational positions.

Figure 17:
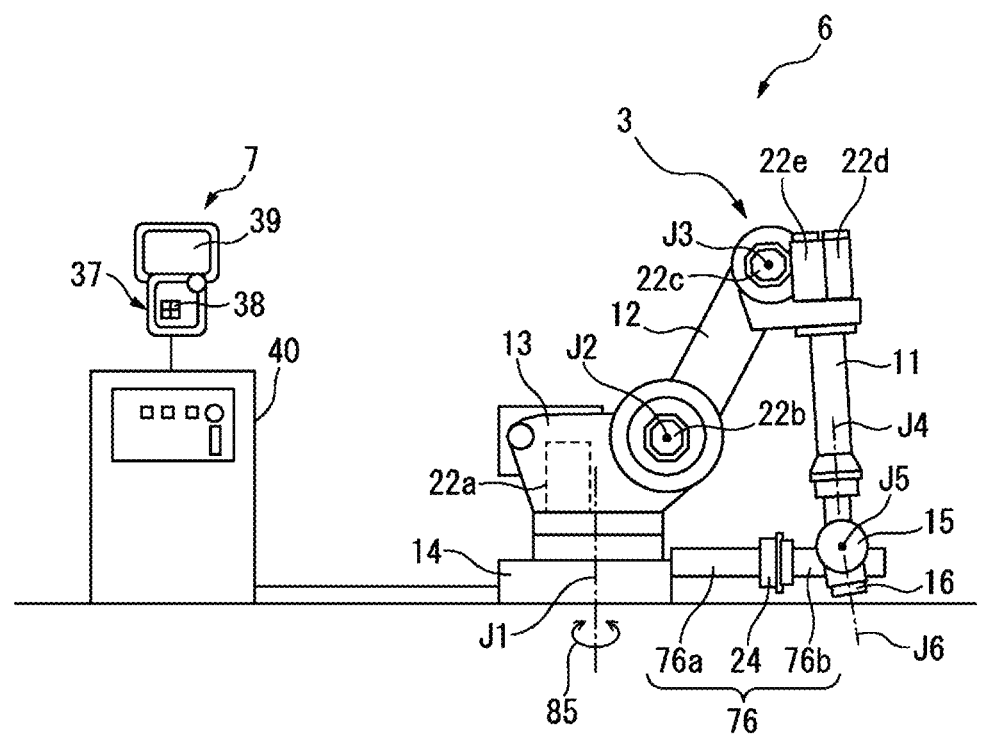
FIG. 17 is a side view of a second robot apparatus of an embodiment.
Figure 18:
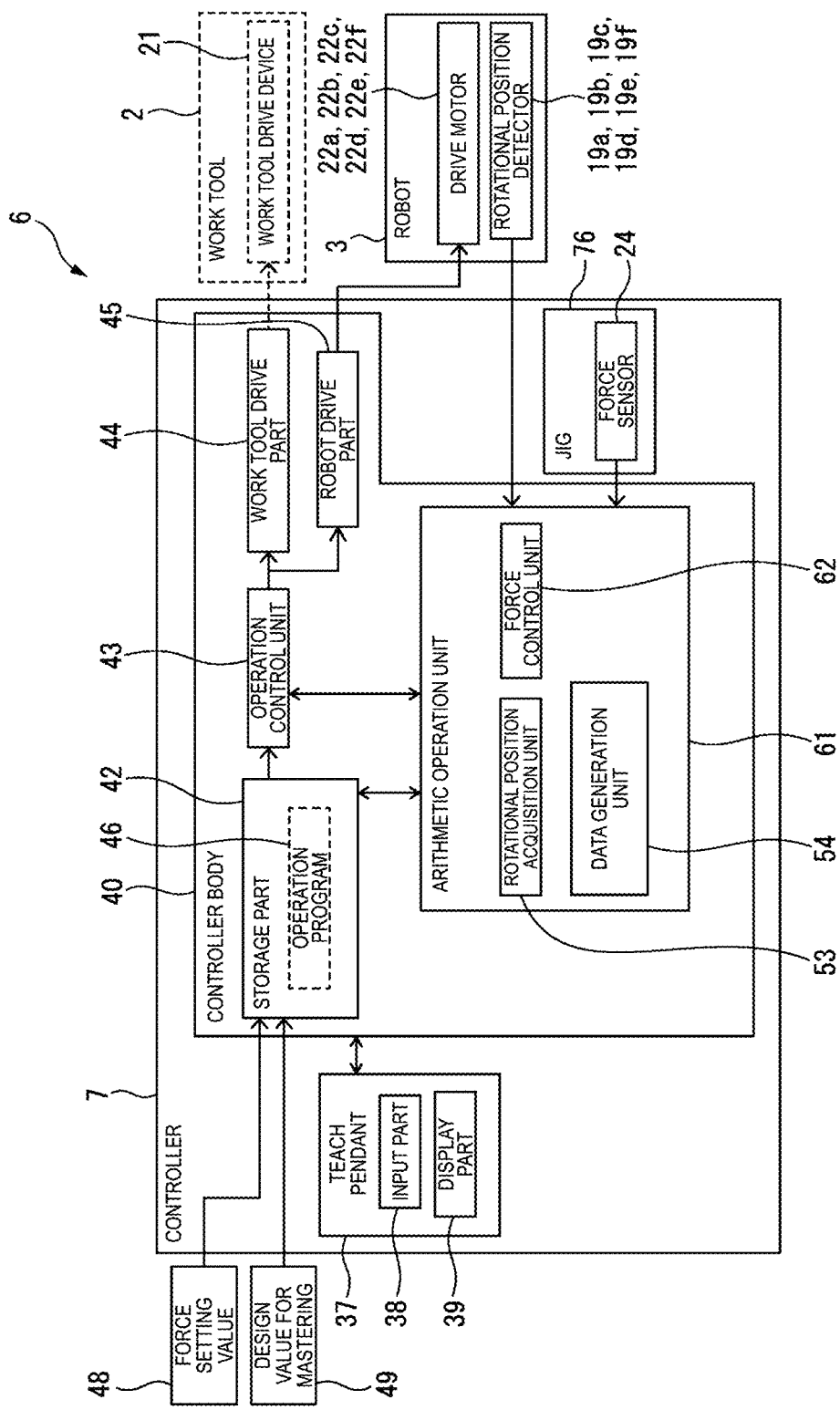
FIG. 18 is a block diagram of the second robot apparatus.

FIG. 17 is a side view of a second robot apparatus according to the present embodiment. FIG. 18 is a block diagram of the second robot apparatus according to the present embodiment. Referring to FIG. 17 and FIG. 18, a second robot apparatus 6 includes a robot 3 and a controller 7. In the second robot apparatus 6, the torque sensors of the first robot apparatus 5 need not be arranged at the joint parts of the robot 3.

The controller 7 of the second robot apparatus 6 includes a jig 76 that blocks the rotation of a constituent member about a specific drive axis. The jig 76 includes a force sensor 24 as a force detector that detects a force in a predetermined direction. The force sensor 24 of the present embodiment can detect forces applied in a positive direction and a negative direction of each of three axes (an X-axis, a Y-axis, and a Z-axis) orthogonal to each other. As the force sensor 24, any force sensor such as a sensor including a strain sensor or a capacitance-type sensor can be used.

The jig 76 includes a fixed part 76*a* attached to one surface of the force sensor 24 and a movable part 76*b* attached to another surface of the force sensor 24. Each of the fixed part 76*a* and the movable part 76*b* of the present embodiment is formed in a rod shape. The fixed part 76*a* is fixed to a member that is stationary when the robot 3 is driven. In this example, the fixed part 76*a* is fixed to the base part 14 of the robot 3. The position and orientation of the jig 76 are precisely adjusted.

The controller 7 of the second robot apparatus 6 performs force control of pressing a constituent member or the jig based on the output of the force sensor 24 instead of the output of the torque sensor. Also in the second robot apparatus, mastering is performed for each drive axis. In this example, the drive axis J1 is selected as the specific drive axis.

The controller 7 includes an arithmetic operation unit 61 that performs the force control and generates mastering data. The arithmetic operation unit 61 includes a force control unit 62 that controls the drive motor for the specific drive axis such that a force output from the force sensor 24 becomes a force setting value 48. The force control unit 62 performs this control when the rotation of a constituent member of the robot 3 is blocked by the jig 76. The force setting value 48 is determined in advance and stored in the storage part 42.

When a force output from the force sensor 24 becomes the force setting value 48, the rotational position acquisition unit 53 acquires a rotational position output by the rotational position detector of the specific drive axis. The data generation unit 54 generates mastering data for the output of the rotational position detector arranged at the specific drive axis, based on the rotational position of the drive motor output by the rotational position detector and the predetermined design value 49 of mastering data.

Figure 19:
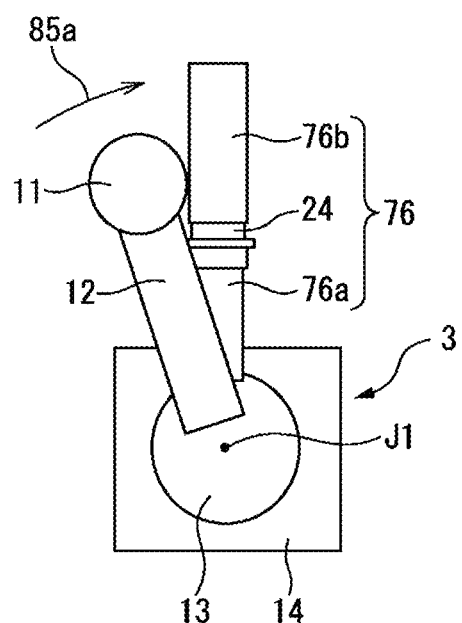
FIG. 19 is a schematic plan view of a robot and illustrates the control of the second robot apparatus.

FIG. 19 is a schematic plan view of the robot and illustrates the control of the second robot apparatus. Referring to FIG. 17 to FIG. 19, in the second robot apparatus 6, the force control unit 62 performs control of pressing the wrist 15 as a constituent member of the robot 3 against the movable part 76*b* of the jig 76. Also in the second robot apparatus, the joint angles of the drive axes other than the specific drive axis are controlled to be kept constant.

The force control unit 62 rotates the wrist 15 in a direction indicated by an arrow 85*a* as a first direction by driving the first drive motor 22*a*. The wrist 15 comes into contact with the movable part 76*b*. The force control unit 62 controls the drive motor 22*a* based on the output of the force sensor 24 such that a force of pressing the movable part 76*b* by the wrist 15 becomes the force setting value 48.

When a force output from the force sensor 24 becomes the force setting value 48, the rotational position acquisition unit 53 acquires a first rotational position output by the rotational position detector 19*a*. The data generation unit 54 can generate mastering data for the output of the rotational position detector 19*a* based on the first rotational position of the drive motor 22*a* output by the rotational position detector 19*a* and the design value 49 of the mastering data.

In the second robot apparatus 6, the force sensor 24 is arranged at the jig 76 instead of the torque sensor of the first robot apparatus. Then, the mastering data is generated by performing force control based on the output of the force sensor 24. Also in the second robot apparatus, mastering can be performed with high accuracy by simple control.

Figure 20:
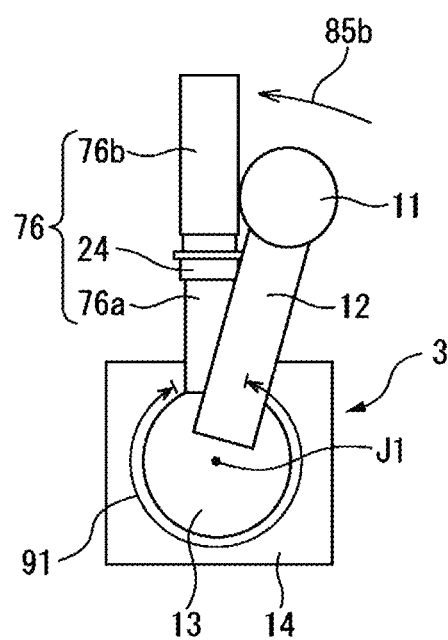
FIG. 20 is another schematic plan view of the robot and illustrates the control of the second robot apparatus.

FIG. 20 is another schematic plan view of the robot and illustrates the control of the second robot apparatus. Also in the second robot apparatus, a correction value for backlash can be calculated as in the second control of the first robot apparatus. The force control unit 62 drives the first drive motor 22a such that the wrist 15 moves in a second direction, opposite to the first direction, indicated by the arrow 85b. The wrist 15 of the robot 3 can be pressed against the movable part 76b of the jig 76. The force control unit 62 performs control of rotating the wrist 15 in the second direction opposite to the first direction.

The force control unit 62 controls the first drive motor 22a such that the movable part 76b is pressed at the predetermined force setting value 48. The rotational position acquisition unit 53 acquires a second rotational position at this time. In this way, the control of rotating a constituent member in the first direction and the control of rotating the constituent member in the second direction opposite to the first direction are performed. The rotational position acquisition unit 53 acquires the first rotational position when the rotation in the first direction is blocked and the second rotational position when the rotation in the second direction is blocked.

Then, the data generation unit 54 calculates a rotation angle from the first rotational position to the second rotational position, indicated by the arrow 91, based on the first rotational position and the second rotational position. The data generation unit 54 can calculate, based on this rotation angle and a theoretical value of the rotation angle, a rotation angle ($\delta/2$) which is a correction value for backlash.

In this way, the mastering data can be generated by disposing a force detector at a constituent member of the robot or at a jig for pressing a workpiece. For example, a force detector can be attached to the jig 71 illustrated in FIG. 12. A force sensor can be attached to the jig 73 illustrated in FIG. 13. A force sensor can be attached to the second member 74b of the jig 74 illustrated in FIG. 14. Then, mastering data can be generated based on the output value of the force detector when the constituent member of the robot or the jig supported by the robot is pressed against the fixed jig and a force design value.

The jig including the force detector according to the present embodiment is formed in a rod shape, but is not limited to this form, and a jig having any shape can be employed. Configurations, actions, and effects of the second robot apparatus other than those described above are similar to those of the first robot apparatus, and the description thereof are not repeated here.

In each of the above-described controls, the sequence of steps can be changed as appropriate to the extent that the functionality and action are not changed.

The above-described embodiments may be combined as appropriate. In the above-described respective drawings, the same or equivalent portions are denoted by the same reference signs. It should be noted that the above-described embodiments are examples and do not limit the invention. The embodiments also include modifications of the embodiments illustrated in the claims.

The invention claimed is:

1. A controller for a robot, the controller being configured to generate mastering data for an output of a rotational position detector attached to a drive motor for one specific drive axis that rotates a constituent member of the robot, the controller comprising:
   a torque detector configured to detect a torque about the specific drive axis;
   a torque control unit configured to control the drive motor for the specific drive axis such that a torque output from the torque detector becomes a torque setting value determined in advance, when rotation of the constituent member about the specific drive axis is blocked by a rotation blocking part;
   a rotational position acquisition unit configured to acquire a rotational position output by the rotational position detector of the specific drive axis, when the torque output from the torque detector becomes the torque setting value; and
   a data generation unit configured to generate mastering data for the output of the rotational position detector arranged at the specific drive axis, based on the rotational position of the drive motor output by the rotational position detector and a predetermined design value of the mastering data.

2. The controller of claim 1, wherein
   the robot includes a second constituent member configured to rotate about the specific drive axis with respect to a first constituent member,
   the rotation blocking part includes a contact portion arranged at the first constituent member and a contact portion arranged at the second constituent member, and is formed such that rotation of the second constituent member is blocked by the contact portion of the first constituent member coming into contact with the contact portion of the second constituent member,
   the torque control unit controls a torque of a drive motor driving the second constituent member such that a torque when the rotation of the second constituent member is blocked becomes the torque setting value determined in advance.

3. The controller of claim 1, wherein
   the robot includes a second constituent member configured to rotate about the specific drive axis with respect to a first constituent member,
   the rotation blocking part includes a jig configured to block rotation of the second constituent member.

4. The controller of claim 3, wherein the jig is fixed to the first constituent member.

5. The controller of claim 3, wherein the jig is fixed to a member being stationary when the robot is driven.

6. The controller of claim 1, wherein
   the torque control unit performs control of rotating the constituent member in a first direction and control of rotating the constituent member in a second direction opposite to the first direction,
   the rotational position acquisition unit detects a first rotational position when rotation in the first direction is blocked and a second rotational position when rotation in the second direction is blocked,
   the data generation unit calculates a correction value for mastering data based on the first rotational position and the second rotational position.

7. A controller for a robot, the controller being configured to generate mastering data for an output of a rotational position detector attached to a drive motor for one specific drive axis that rotates a constituent member of the robot, the controller comprising:
   a jig including a force detector and configured to block rotation of the constituent member about the specific drive axis;
   a force control unit configured to control the drive motor for the specific drive axis such that a force output from the force detector becomes a force setting value determined in advance, when the rotation of the constituent member about the specific drive axis is blocked by the jig;

a rotational position acquisition unit configured to acquire a rotational position output by the rotational position detector of the specific drive axis when the force output from the force detector becomes the force setting value; and a data generation unit configured to generate mastering data for the output of the rotational position detector arranged at the specific drive axis, based on the rotational position of the drive motor output by the rotational position detector and a predetermined design value of the mastering data.

8. The controller of claim 7, wherein the force control unit performs control of rotating the constituent member in a first direction and control of rotating the constituent member in a second direction opposite to the first direction, the rotational position acquisition unit detects a first rotational position when rotation in the first direction is blocked and a second rotational position when rotation in the second direction is blocked, the data generation unit calculates a correction value for mastering data based on the first rotational position and the second rotational position.

* * * * *